UNITED STATES PATENT OFFICE.

JOHN T. HEWITT, OF LONDON, ENGLAND.

PURIFYING ALCOHOLIC LIQUIDS.

SPECIFICATION forming part of Letters Patent No. 625,108, dated May 16, 1899.

Application filed November 8, 1898. Serial No. 695,871. (No specimens.)

*To all whom it may concern:*

Be it known that I, JOHN THEODORE HEWITT, professor of chemistry, a citizen of England, residing at 65 Silverdale, Sydenham, London, in the county of Kent, England, have invented certain new and useful Improvements in the Purification of Alcoholic Liquids, (for which I have applied for a patent in Great Britain, dated October 27, 1898, No. 22,607,) of which the following is a specification.

Among the impurities in alcoholic liquids distilled from fermented wort and the like are certain aldehydes, such as furfurol and other bodies of aldehydic or ketonic character. Such bodies combine with hydrazines, forming non-volatile hydrazones.

My invention relates to means of removing these impurities. For this purpose I add to the crude alcoholic liquid a primary hydrazine of the general form $R.NH.NH_2$, in which R stands for hydrogen, an alkyl radical, an aromatic radical, or acidyl radical, such as phenylhydrazine ($C_6H_5.NH.NH_2$) or a substitution derivative thereof having the substituent in the hydrocarbon nucleus or radical—such as, for instance, a sodium salt of phenylhydrazineparasulfonic acid,

In this way I convert the impurities in question into non-volatile hydrazones, which on distilling the mixture remain in the still. The proportion of the hydrazine or substituted hydrazine added is either that sufficient to combine with the aldehydic and ketonic impurities or it may be in excess of that proportion. If the distillate be not required quite pure, the proportion may be in deficiency of that required to combine with the said impurities. It is well known that all such primary hydrazines have the property of combining with aldehydes and ketones, respectively, forming hydrazones, which, I find, are not volatile to an appreciable extent.

Where a primary hydrazine itself is used, some of the hydrazine may pass over with the distillate, in which case a second distillation in a column-still or after addition of some non-volatile acid, like sulfuric acid, will be required to remove the hydrazine; but it is preferable to use a non-volatile substituted primary hydrazine having the substituent in the hydrocarbon nucleus or radical. I find the sodium salt of phenylhydrazineparasulfonic acid very suitable. In this case the hydrazine is not likely to pass over into the distillate.

I find that 0.5 pound of phenylhydrazine or one pound of sodium phenylhydrazineparasulfonate added for every one hundred pounds of liquid to be distilled is generally sufficient to retain the aldehydes and the ketones in the retort. This proportion may vary, however, according to the practice of the distillery as to the mode of fermentation and the materials used.

Having thus described the nature of this invention and the best means I know of carrying the same into practical effect, I claim—

A process for the purification of alcoholic liquids, which consists in adding to the liquid a primary hydrazine, such as phenylhydrazine, or a substitution derivative thereof such as a sodium salt of phenylhydrazineparasulfonic acid, and distilling the mixture, substantially as described.

In testimony whereof I have hereunto set my hand in presence of two subscribing witnesses.

JOHN T. HEWITT.

Witnesses:
JNO. P. M. MILLARD,
GERALD L. SMITH.